(12) United States Patent
Zhang et al.

(10) Patent No.: US 11,496,950 B2
(45) Date of Patent: Nov. 8, 2022

(54) METHOD FOR DETERMINING PARAMETER SET OF CELL, METHOD FOR SENDING PARAMETER SET OF CELL, DEVICE, AND SYSTEM

(71) Applicant: Huawei Technologies Co., Ltd., Shenzhen (CN)

(72) Inventors: Xingwei Zhang, Beijing (CN); Shulan Feng, Beijing (CN); Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/365,069

(22) Filed: Mar. 26, 2019

(65) Prior Publication Data

US 2019/0230582 A1 Jul. 25, 2019

Related U.S. Application Data

(63) Continuation of application No. PCT/CN2016/100201, filed on Sep. 26, 2016.

(51) Int. Cl.
*H04W 48/16* (2009.01)
*H04L 27/26* (2006.01)
(Continued)

(52) U.S. Cl.
CPC ........... *H04W 48/16* (2013.01); *H04L 5/0048* (2013.01); *H04L 5/0053* (2013.01);
(Continued)

(58) Field of Classification Search
CPC ...... H04W 48/16; H04W 24/00; H04L 27/26; H04L 5/0007; H04L 5/0014;
(Continued)

(56) References Cited

U.S. PATENT DOCUMENTS

2008/0205351 A1 8/2008 Lindoff et al.
2010/0135257 A1* 6/2010 Higuchi ............... H04J 11/0069
370/336
(Continued)

FOREIGN PATENT DOCUMENTS

CN 101507223 A 8/2009
CN 101636992 A 1/2010
(Continued)

OTHER PUBLICATIONS

"Numerology and frame structure for 5G new radio interface: sub-6GHz," 3GPP TSG RAN WG1 #84bis, Busan, Korea, R1-162179, pp. 1-5, 3rd Generation Partnership Project—Valbonne, France (Apr. 11-15, 2016).

(Continued)

*Primary Examiner* — Liton Miah
(74) *Attorney, Agent, or Firm* — Leydig, Voit & Mayer, Ltd.

(57) ABSTRACT

Embodiments of the present invention relate to the communications field, and provide a method for determining a parameter set of a cell, a method for sending a parameter set of a cell, a device, and a system, so that a terminal can identify a parameter set of a cell in 5G NR supporting a plurality of parameter sets of the cell. The solutions provided in the embodiments of the present invention include: determining, by a base station, feature information of an identification signal based on a parameter set of a cell, wherein the parameter set of the cell comprises a subcarrier spacing; and sending the identification signal to a terminal based on the feature information of the identification signal.

12 Claims, 14 Drawing Sheets

(51) Int. Cl.
*H04L 5/00* (2006.01)
*H04W 24/00* (2009.01)

(52) U.S. Cl.
CPC .......... *H04L 5/0091* (2013.01); *H04L 5/0092* (2013.01); *H04L 27/26* (2013.01); *H04W 24/00* (2013.01); *H04L 5/0007* (2013.01); *H04L 5/0014* (2013.01)

(58) Field of Classification Search
CPC ... H04L 5/0048; H04L 5/0053; H04L 5/0091; H04L 5/0092
See application file for complete search history.

(56) References Cited

U.S. PATENT DOCUMENTS

| | | | | |
|---|---|---|---|---|
| 2013/0142138 | A1* | 6/2013 | Dinan | H04W 72/04 370/329 |
| 2014/0036820 | A1* | 2/2014 | McNamara | H04L 5/0044 370/329 |
| 2014/0341175 | A1* | 11/2014 | Beale | H04L 5/0053 370/330 |
| 2015/0003427 | A1* | 1/2015 | Wan | H04W 72/042 370/336 |
| 2015/0256308 | A1* | 9/2015 | Ma | H04W 72/042 370/330 |
| 2015/0282178 | A1* | 10/2015 | Kim | H04B 7/2656 370/329 |
| 2015/0289219 | A1 | 10/2015 | Kim et al. | |
| 2016/0112979 | A1* | 4/2016 | Takano | H04W 56/0015 370/336 |

FOREIGN PATENT DOCUMENTS

| | | |
|---|---|---|
| CN | 102017718 A | 4/2011 |
| CN | 102231893 A | 11/2011 |
| CN | 102752769 A | 10/2012 |
| CN | 103874207 A | 6/2014 |
| CN | 105359604 B | 2/2020 |
| CN | 105900503 B | 5/2020 |
| WO | 2016041604 A1 | 3/2016 |

OTHER PUBLICATIONS

"Band agnostic synchronization and cell search," 3GPP TSG RAN WG1 Meeting #86 Gothenburg, Sweden, R1-166949, pp. 1-3, 3rd Generation Partnership Project—Valbonne, France (Aug. 22-26, 2016).

"Access mechanism for beam based approach," 3GPP TSG RAN WG1 Meeting #86, Gothenburg, Sweden, R1-166088, XP051125205, pp. 1-8, 3rd Generation Partnership Project, Valbonne, France (Aug. 22-26, 2016).

"Discussion on initial access and mobility for NR", 3GPP TSG RAN WG1 Meeting #86, Gothenburg, Sweden, R1-167912, XP051133177, pp. 1-10, 3rd Generation Partnership Project, Valbonne, France (Aug. 22-26, 2016).

* cited by examiner

METHOD FOR DETERMINING PARAMETER SET OF CELL, METHOD FOR SENDING PARAMETER SET OF CELL, DEVICE, AND SYSTEM

CROSS-REFERENCE TO RELATED APPLICATIONS

This application is a continuation of International Application No. PCT/CN2016/100201, filed on Sep. 26, 2016, the disclosure of which is hereby incorporated by reference in its entirety.

TECHNICAL FIELD

Embodiments of the present disclosure relate to the communications field, and in particular, to a method for determining a parameter set of a cell, a method for sending a parameter set of a cell, a device, and a system.

BACKGROUND

As mobile services have increasingly high performance requirements, mobile communications technologies have developed to the fifth-generation mobile communications technology (5G). 5G has higher service performance. A new air interface access technology is defined in 5G new radio access technologies (RAT), and can support a higher user experience rate, a larger connection quantity and higher traffic density, a millisecond-level end-to-end delay, and a higher peak rate. In addition, network deployment and operation efficiency is greatly improved in 5G. Currently, it has been determined that a plurality of parameters such as a subcarrier spacing, a symbol length, and a subframe length are supported in 5G NR.

In a communication process, a terminal usually performs signal transmission with a base station based on a parameter set of a cell. For example, in a Long Term Evolution (LTE) system, a parameter set of a cell is that a subcarrier spacing is 15 kHz, a subframe length is 1 ms, and one subframe includes 14 or 12 symbols. The parameter set of the cell is fixed in the LTE system and is known by both the base station and the terminal, and a signal may be transmitted between the terminal and the base station directly by using the fixed parameter set of the cell.

However, in 5G NR technologies, a cell supports a plurality of parameter sets, and before accessing a network, a terminal does not know a parameter set used by a cell. Therefore, the terminal needs to first identify a parameter set of a cell before performing signal transmission with a base station. Therefore, how the terminal identifies the parameter set of the cell in 5G NR becomes a problem that urgently needs to be resolved.

SUMMARY

Embodiments of the present invention provide a method for determining a parameter set of a cell, a method for sending a parameter set of a cell, a device, and a system, so that a terminal can identify a parameter set of a cell in 5G NR supporting a plurality of parameter sets of the cell.

The following technical solutions are used in the embodiments of the present invention to achieve the foregoing objectives.

According to a first aspect of this application, a method for determining a parameter set of a cell is provided, applied to a terminal. The method specifically includes: obtaining feature information of an identification signal of a cell; and determining a parameter set of the cell based on the feature information of the identification signal, where the parameter set of the cell includes at least one of the following parameters: a subcarrier spacing, a subframe length, a symbol length, a timeslot length, a cyclic prefix (CP) length, a quantity of symbols in a subframe, a quantity of symbols in a timeslot, a subframe type, a timeslot type, a CP type, a duplex mode, whether a spectrum is a licensed spectrum, whether a carrier is an independent carrier, whether there are a plurality of beams, a quantity of beams, and a service requirement.

In the provided method for determining a parameter set of a cell in this application, the feature information of the identification signal carries the parameter set of the cell, and different feature information of the identification signal can be used to accurately distinguish different parameter sets of the cell. When obtaining the identification signal, the terminal can accurately identify the parameter set of the cell based on the feature information of the identification signal, so that the terminal can identify the parameter set of the cell in 5G NR supporting a plurality of parameter sets of the cell.

In a possible implementation, the determining a parameter set of the cell based on the feature information of the identification signal may be specifically implemented as: determining the parameter set of the cell from N parameter sets based on the feature information of the identification signal, where N is greater than or equal to 2. The N parameter sets are parameter sets that are supported by the cell and that are defined in a communication standard of a communications system to which the cell belongs. In this way, the terminal can accurately identify, based on the feature information of the identification signal, the parameter set of the cell in a plurality of parameter sets supported by the cell, thereby improving recognition efficiency.

In another possible implementation, the determining a parameter set of the cell based on the feature information of the identification signal includes: determining the parameter set of the cell based on the feature information of the identification signal and a mapping relationship, where the mapping relationship includes a correspondence between feature information and at least one parameter set. The mapping relationship is used to indicate a correspondence between feature information of a signal and a parameter set. When obtaining the feature information of the identification signal, the terminal may directly search for and determine the parameter set of the cell. Therefore, this implementation is simple and fast.

In the mapping relationship, a group of feature information may uniquely correspond to a parameter set. Alternatively, in the mapping relationship, one piece of the feature information may correspond to a plurality of parameter sets, and an intersection set of parameter sets corresponding to each piece of information in the group of feature information is a unique parameter set. Alternatively, in the mapping relationship, a parameter in the parameter set may correspond to a plurality of groups of feature information, and an intersection set of feature information corresponding to each parameter in the parameter set is unique feature information. In this application, specific corresponding content in the mapping relationship is not limited.

In another possible implementation, a solution for obtaining the feature information of the identification signal of the cell is provided, and may specifically include: performing matching based on a reference parameter set, to obtain the identification signal of the cell, and parsing the identification signal to obtain the feature information of the identification signal. To be specific, regardless of content of the parameter set of the cell, the identification signal is sent based on the reference parameter set. When obtaining the identification signal, the terminal performs matching based on the reference parameter set, so that the identification signal is received simply and detection complexity of the terminal is reduced.

With reference to the first aspect or any one of the foregoing possible implementations, in another possible implementation, another solution for obtaining the feature information of the identification signal of the cell is provided, and may specifically include: sequentially performing matching based on M preset reference parameter sets, until the identification signal of the cell is obtained, and parsing the identification signal to obtain the feature information of the identification signal, where M is greater than or equal to 2. The identification signal is sent based on the parameter set of the cell. When obtaining the identification signal, the terminal performs, based on a possible parameter set, blind detection for matching. Therefore, design of the identification signal is simple.

According to a second aspect of this application, a method for sending a parameter set of a cell is provided, applied to a base station. The method specifically includes: determining feature information of an identification signal based on a parameter set of a cell; and sending the identification signal to a terminal based on the determined feature information of the identification signal, where the parameter set of the cell includes at least one of the following parameters: a subcarrier spacing, a subframe length, a symbol length, a timeslot length, a CP length, a quantity of symbols in a subframe, a quantity of symbols in a timeslot, a subframe type, a timeslot type, a CP type, a duplex mode, whether a spectrum is a licensed spectrum, whether a carrier is an independent carrier, whether there are a plurality of beams, a quantity of beams, and a service requirement.

In the provided method for sending a parameter set of a cell in this application, the feature information of the identification signal carries the parameter set of the cell, different feature information of the identification signal may be used to accurately identify different parameter sets of the cell, and sending of the parameter set of the cell is completed when the identification signal is sent. When obtaining the identification signal, the terminal can accurately identify the parameter set of the cell based on the feature information of the identification signal, so that the terminal can identify the parameter set of the cell in 5G NR supporting a plurality of parameter sets of the cell.

In a possible implementation, the determining feature information of an identification signal based on a parameter set of a cell includes: determining the feature information of the identification signal based on the parameter set of the cell and a mapping relationship, where the mapping relationship includes a correspondence between a parameter set and at least one piece of feature information. The mapping relationship is used to indicate a correspondence between feature information of a signal and a parameter set, and when sending the identification signal, the base station may directly search for the mapping relationship to determine the feature information of the identification signal. Therefore, this implementation is simple and fast.

The mapping relationship in the second aspect is the same as that in the first aspect, and details are not described herein again.

In another possible implementation, the solution for sending the identification signal to the terminal based on the determined feature information of the identification signal may be specifically implemented as: sending the identification signal to the terminal based on a reference parameter set and the determined feature information of the identification signal. To be specific, regardless of content of the parameter set of the cell, the identification signal is sent based on the reference parameter set. When obtaining the identification signal, the terminal performs matching based on the reference parameter set, so that the identification signal is received simply and detection complexity of the terminal is reduced.

In another possible implementation, the solution for sending the identification signal to the terminal based on the determined feature information of the identification signal may be specifically implemented as: sending the identification signal to the terminal based on the parameter set of the cell and the determined feature information of the identification signal. Therefore, design of the identification signal is simple.

In another possible implementation, to improve implementation diversity of the solution and achieve different effects, the identification signal may include at least one of the following signals/channel: a synchronization signal, a broadcast channel, and a reference signal. If the identification signal is a synchronization signal, in an earliest synchronization stage, the terminal can identify the parameter set of the cell, thereby reducing a delay of identifying the parameter set by the terminal. If the identification signal is a broadcast signal, the parameter set of the cell may be indicated by an explicit field, and design of the identification signal is simple. If the identification signal is a reference signal, synchronization signals may be uniformly designed, and the terminal does not need to blindly detect a synchronization signal, and can identify the parameter set of the cell early at a channel estimation stage by using a reference signal sequence.

In another possible implementation, the reference signal may include an independent reference signal, or may include a reference signal of a broadcast channel.

In another possible implementation, the feature information of the identification signal is information that may be used to distinguish a signal in any dimension. To improve implementation diversity of the solution, the feature information of the identification signal may include at least one piece of the following information: time domain resource information of the identification signal, frequency domain resource information of the identification signal, space domain resource information of the identification signal, code domain resource information of the identification signal, power parameter information of the identification signal, type information of the identification signal, a type quantity of the identification signal, and parameter set indication information, where the parameter set indication information is used to indicate the parameter set of the cell. The parameter set indication information may be an explicit field.

In another possible implementation, the time domain resource information is feature information that may be used to distinguish a signal in a time dimension. The time domain resource information is used as the feature information, so that the terminal identifies the parameter set of the cell by using the time domain resource information of the identification signal. The time domain resource information of the identification signal includes at least one piece of the following information: a time domain location of the identification signal, a time domain spacing of the identification signal, a period of the identification signal, a quantity of repetition times of the identification signal, and a transmission time occupied by the identification signal.

In another possible implementation, the frequency domain resource information is feature information that may be used to distinguish a signal in a frequency dimension. The frequency domain resource information is used as the feature information, so that the terminal identifies the parameter set of the cell by using the frequency domain resource information of the identification signal. The frequency domain resource information of the identification signal may include: a frequency domain bandwidth of the identification signal; or a frequency domain bandwidth of the identification signal and a frequency domain location of the identification signal.

In another possible implementation, the space domain resource information is feature information that may be used to distinguish a signal in a space dimension. The space domain resource information is used as the feature information, so that the terminal identifies the parameter set of the cell by using the space domain resource information of the identification signal. The space domain resource information of the identification signal may include at least one piece of the following information: a quantity of antenna ports for transmitting the identification signal, a number of an antenna port for transmitting the identification signal, a quantity of antennas for transmitting the identification signal, a quantity of beams for transmitting the identification signal, and a number of a beam for transmitting the identification signal.

In another possible implementation, the code domain resource information is feature information that may be used to distinguish a signal in an encoding mode dimension. The code domain resource information is used as the feature information, so that the terminal identifies the parameter set of the cell by using the code domain resource information of the identification signal. The code domain resource information of the identification signal may include at least one piece of the following information: a root sequence of the identification signal, a cyclic shift of the identification signal, an orthogonal cover code of the identification signal, and a scrambling code of the identification signal.

In another possible implementation, the power parameter information is feature information that may be used to distinguish a signal in a signal power dimension. The power parameter information is used as the feature information, so that the terminal identifies the parameter set of the cell by using the power parameter information of the identification signal. The power parameter information of the identification signal may include: transmit power of the identification signal or a transmit power difference of the identification signal, where the transmit power difference of the identification signal includes a transmit power difference between different types of identification signals, or a transmit power difference between identification signals of a same type that are sent twice.

In another possible implementation, the type information is feature information that may be used to distinguish a signal in a signal type dimension. The type information is used as the feature information, so that the terminal identifies the parameter set of the cell by using the type information of the identification signal. The type information of the identification signal includes at least one piece of the following information: the identification signal is a primary synchronization signal, the identification signal is a secondary synchronization signal, the synchronization signal is a synchronization signal based on a base station, and the identification signal is a synchronization signal based on a satellite.

According to a third aspect, an embodiment of the present invention provides a terminal. The terminal can implement the functions performed by the network terminal in the foregoing method example, and the functions may be implemented by hardware or may be implemented by hardware executing corresponding software. The hardware or the software includes one or more modules corresponding to the functions.

With reference to the third aspect, in a possible implementation, a structure of the terminal includes a processor and a transceiver. The processor is configured to support the terminal in performing corresponding functions in the foregoing method. The transceiver is configured to support communication between the terminal and another network element. The terminal may further include a memory. The memory is configured to couple to the processor, and store a necessary program instruction and data of the terminal.

According to a fourth aspect, an embodiment of the present invention provides a base station. The base station can implement the functions performed by the base station in the foregoing method example, and the functions may be implemented by hardware or may be implemented by hardware executing corresponding software. The hardware or the software includes one or more modules corresponding to the functions.

With reference to the fourth aspect, in a possible implementation, a structure of the base station includes a processor and a transceiver. The processor is configured to support the base station in performing corresponding functions in the foregoing method. The transceiver is configured to support communication between the base station and another network element. The base station may further include a memory. The memory is configured to couple to the processor, and store a necessary program instruction and data of the base station.

According to a fifth aspect, an embodiment of the present invention provides a communications system. The system includes the terminal according to any one of the foregoing aspects or the foregoing possible implementations and the base station according to any one of the foregoing aspects or the foregoing possible implementations.

According to a sixth aspect, an embodiment of the present invention provides a computer storage medium, configured to store a computer software instruction used by the foregoing terminal. The computer storage medium contains a program designed for executing the foregoing aspects.

According to a seventh aspect, an embodiment of the present invention provides a computer storage medium, configured to store a computer software instruction used by the base station. The computer storage medium contains a program designed for executing the foregoing aspects.

The solutions provided in the third aspect to the seventh aspect are used to implement the method provided in the first aspect or the second aspect, and therefore can achieve same beneficial effects as the first aspect or the second aspect. Details are not described herein again.

BRIEF DESCRIPTION OF DRAWINGS

To describe the technical solutions in the embodiments of the present invention more clearly, the following briefly describes the accompanying drawings describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Before the embodiments of the present invention are described, a network architecture of a scenario to which the solutions of this application are applied is first described. A method according to the embodiments of this application is applied to a communications system shown in FIG. 1. The system includes at least one base station 101. Each base station 101 serves at least one terminal 102 by using a wireless interface. The base station 101 communicates with the terminal 102 based on a parameter set of a cell served by the base station 101.

Figure 1:
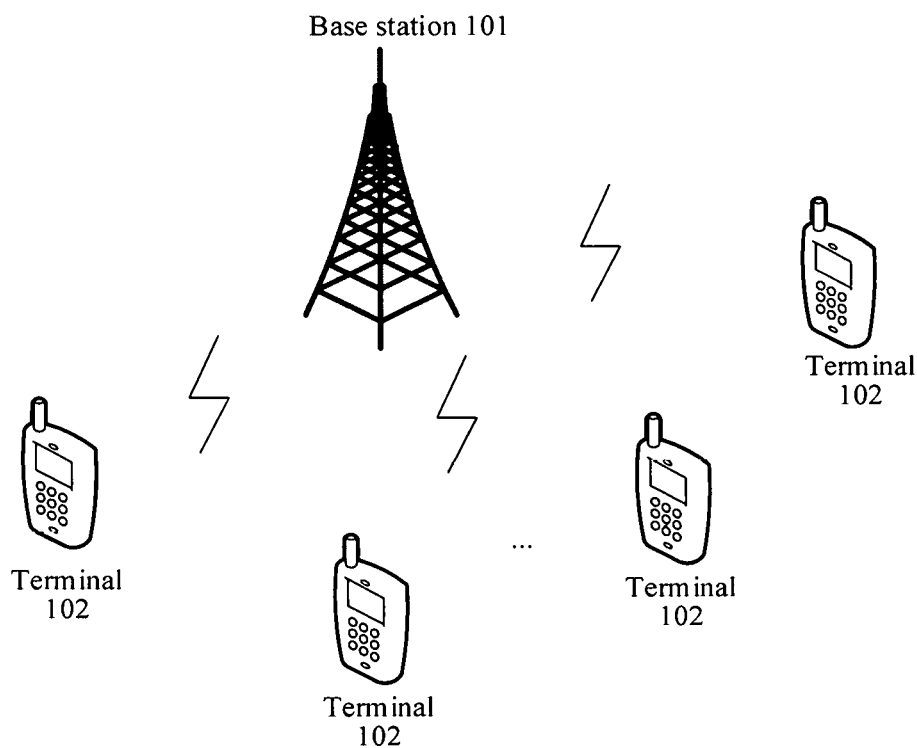
FIG. 1 is a schematic diagram of a network structure of a communications system according to an embodiment of the present invention.

It should be noted that a quantity of base stations 101 included in the communications system shown in FIG. 1 and a quantity of terminals 102 served by each base station 101 are both deployed based on an actual network requirement. This is not specifically limited in this application.

FIG. 1 shows only an example of one base station 101 and a terminal 102 served by the base station 101. The content shown in FIG. 1 does not specifically limit a quantity of base stations 101 included in the communications system and a quantity of terminals 102 served by the base station 101.

The terminal 102 may be a mobile station, a remote station, a user terminal, or the like. The terminal 102 may be specifically a user terminal such as a mobile phone, a tablet computer, or a personal digital assistant. This is not specifically limited in this embodiment of the present invention.

A method for determining a parameter set of a cell and a method for sending a parameter set of a cell that are provided in the embodiments of the present invention may be performed by the terminal 102 and the base station 101 in the network architecture of the communications system shown in FIG. 1. A cell served by the base station 101 supports a plurality of parameter sets. After identifying a parameter set used by the cell served by the base station 101, the terminal 102 accesses the cell served by the base station 101 and communicates with the base station 101.

Figure 2:
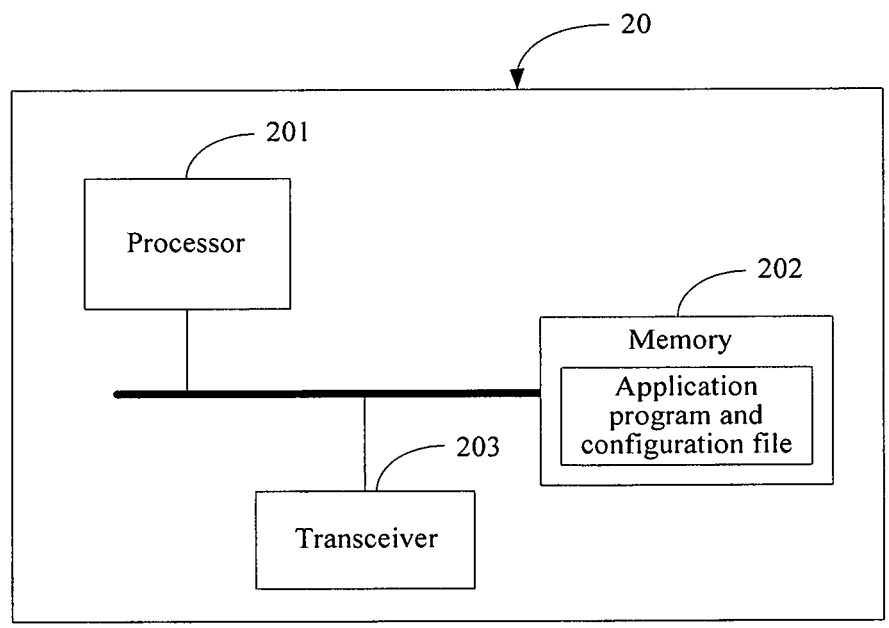
FIG. 2 is a schematic structural diagram of a terminal according to an embodiment of the present invention.

FIG. 2 is a schematic structural diagram of a terminal 20 related to the embodiments of the present invention. The terminal 20 may be any terminal 102 deployed in FIG. 1.

As shown in FIG. 2, the terminal 20 may include: a processor 201, a memory 202, and a transceiver 203.

The following specifically describes the components of the terminal 20 with reference to FIG. 2.

The memory 202 may be a volatile memory, for example, a random access memory (RAM), or a non-volatile memory, for example, a read-only memory (ROM), a flash memory, a hard disk drive (HDD), or a solid-state drive (SSD), or a combination of the foregoing memories. The memory 202 is configured to store a related application program and a configuration file that can be used to perform the method in the present invention.

The processor 201 is a control center of the terminal 20, and may be a central processing unit (CPU) or an application-specific integrated circuit (ASIC), or may be configured to be one or more integrated circuits for implementing the embodiments of the present invention, for example, one or more microprocessors (DSP) or one or more field programmable gate arrays (FPGA). The processor 201 may run or execute a software program and/or a module stored in the memory 202, and invoke data stored in the memory 202, to perform various functions of the terminal 20.

The transceiver 203 may be a communications port, a communications interface, a transceiver antenna, or the like of the terminal 20, and is configured to transfer information or a message with another network element.

Figure 3:
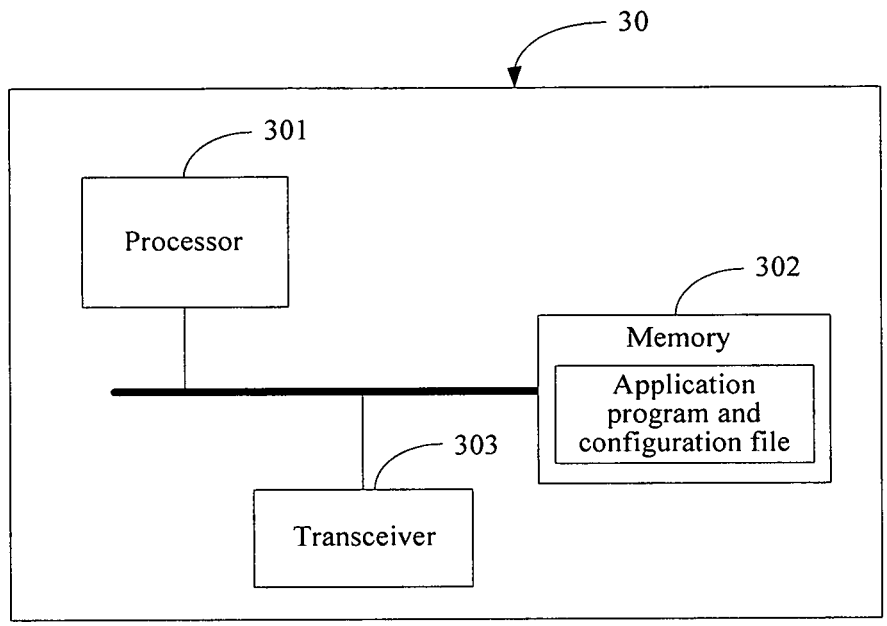
FIG. 3 is a schematic structural diagram of a base station according to an embodiment of the present invention.

Further, FIG. 3 is a schematic structural diagram of a base station 30 related to the embodiments of the present invention. The base station 30 may be the base station 101 deployed in FIG. 1.

As shown in FIG. 3, the base station 30 may include: a processor 301, a memory 302, and a transceiver 303.

The following specifically describes the components of the base station 30 with reference to FIG. 3.

The memory 302 may be a volatile memory, for example, a RAM, or a non-volatile memory, for example, a ROM, a flash memory, an HDD, or an SSD; or a combination of the foregoing memories, and is configured to store a related application program and a configuration file that can be used to perform the method in the present invention.

The processor 301 is a control center of the base station 30, and may be a CPU, an ASIC, or one or more integrated circuits configured to implement the embodiments of the present invention, for example, one or more DSPs or one or more FPGAs. The processor 301 may run or execute a software program and/or a module stored in the memory 302, and invoke data stored in the memory 302, to perform various functions of the base station 20.

The transceiver 303 may be a communications port, a communications interface, a transceiver antenna, or the like of the base station 30, and is configured to transfer information or a message with another network element.

The following describes in detail the embodiments of this invention with reference to the accompanying drawings.

Figure 4:
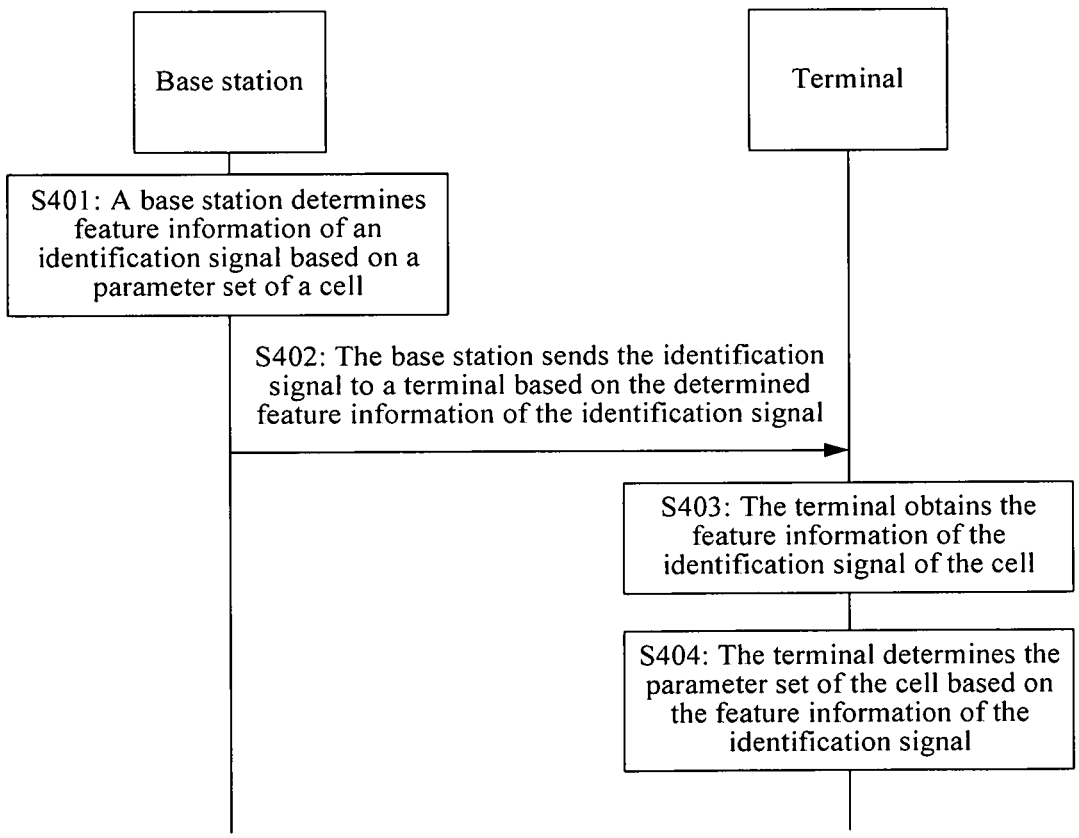
FIG. 4 is a schematic flowchart of a method for determining a parameter set of a cell and a method for sending a parameter set of a cell according to an embodiment of the present invention.

According to an aspect, an embodiment of the present invention provides a method for determining a parameter set of a cell and a method for sending a parameter set of a cell, applied to the communications system shown in FIG. 1. As shown in FIG. 4, the method may include the following steps.

S401: A base station determines feature information of an identification signal based on a parameter set of a cell.

Specifically, a processor 301 of the base station shown in FIG. 3 may perform specific content in S401.

The parameter set of the cell includes at least one of the following parameters: a subcarrier spacing, a subframe length, a symbol length, a timeslot length, a CP length, a quantity of symbols in a subframe, a quantity of symbols in a timeslot, a subframe type, a timeslot type, a CP type, a duplex mode, whether a spectrum is a licensed spectrum, whether a carrier is an independent carrier, whether there are a plurality of beams, a quantity of beams, and a service requirement.

It should be noted that a parameter type included in a parameter set used by a cell may be configured based on an actual requirement, and this is not specifically limited in this embodiment of the present invention. A specific value of a parameter included in the parameter set is defined based on a communication standard, and this is not specifically limited in this embodiment of the present invention either.

The following uses an example to describe the parameter included in the parameter set.

For example, optional values of the subcarrier spacing include: 3.75 kilohertz (kHz), 9 kHz, 7.5 kHz, 15 kHz, 30 kHz, 60 kHz, 120 kHz, 240 kHz, 480 kHz, and the like.

Optional values of the subframe length may include: 1 millisecond (ms), 0.5 ms, and the like.

Optional values of the symbol length may include: 71 microsecond (μs) and the like.

Optional values of the timeslot length may include: 0.5 ms and the like.

Optional values of the CP length may include: 5 μs and the like.

Optional values of a quantity of symbols in a subframe may include 1 to 14.

Optional values of a quantity of symbols in a timeslot may include 1, 2, 3, 4, 5, 6, and 7.

Optional values of the subframe/timeslot type may include: full uplink, full downlink, and uplink+guard spacing+downlink.

Optional values of the CP type may include: a normal cyclic prefix (NCP), an extended cyclic prefix (ECP), a CP type 1, a CP type 2, and the like.

Optional values of the duplex mode may include: frequency division duplex (FDD), time division duplex (TDD), flexible duplex, and full duplex.

Optional values of whether a spectrum is a licensed spectrum may include: a licensed spectrum and an unlicensed spectrum.

Optional values of whether a carrier is an independent carrier may include: an independent carrier and a dependent carrier.

An optional value of whether there are a plurality of beams or the quantity of beams may include: single beam/multi-beam or a quantity of beams.

Optional values of the service requirement may include: enhanced mobile broadband (eMBB), ultra reliable and low latency communications (URLLC), massive machine-type communications (mMTC), and Vehicle to X (V2X).

It should be noted that the foregoing describes only examples of the parameters included in the parameter set, and does not specifically limit values of the parameters included in the parameter set.

Optionally, the identification signal may include at least one of the following signals/channel: a synchronization signal, a broadcast channel, and a reference signal. Therefore, the identification signal may be one of the foregoing signals/channel or a combination of the foregoing signals/channel.

Certainly, the identification signal may alternatively be another signal that may be used to carry the feature information, and a type of the identification signal is not specifically limited in this embodiment of the present invention.

The reference signal may be an independent reference signal or may be a reference signal of a broadcast channel. This is not specifically limited in this embodiment of the present invention.

Optionally, the feature information of the identification signal includes at least one piece of the following information: time domain resource information of the identification signal, frequency domain resource information of the identification signal, space domain resource information of the identification signal, code domain resource information of the identification signal, power parameter information of the identification signal, type information of the identification signal, a type quantity of the identification signal, and parameter set indication information.

It should be noted that information included in the feature information of the identification signal may be set based on an actual requirement and is not limited to the foregoing examples. Any information that may be used to distinguish a signal may be used as the feature information of the identification signal.

Specifically, for different identification signals used to distinguish parameter sets, one piece of feature information is different, and feature information in another dimension may be the same or different. This is not specifically limited in this embodiment of the present invention.

The parameter set indication information is used to indicate the parameter set of the cell. The parameter set indication information may be an explicit field, and different fields correspond to different parameter sets. The parameter set indication information may be uniquely determined based on the parameter set of the cell. A corresponding parameter set may be uniquely determined quickly based on the field of the parameter set indication information.

It should be noted that a type and a form of the field of the parameter set indication information may be set based on an actual requirement. This is not specifically limited in this embodiment of the present invention. A correspondence between parameter set indication information and a parameter set may also be set based on an actual requirement. This is not specifically limited in this embodiment of the present invention either.

The time domain resource information is information used to distinguish different signals in a time dimension. The time domain resource information of the identification signal may include at least one piece of the following information: a time domain location of the identification signal, a time domain spacing of the identification signal, a period of the identification signal, a quantity of repetition times of the identification signal, and a transmission time occupied by the identification signal.

Specifically, the time domain location may be an absolute location of a type of identification signal, or may be relative locations of two types of identification signals. This is not specifically limited in this embodiment of the present invention.

The time domain spacing of the identification signal is a time spacing between at least two types of identification signals in a same period in time domain.

The period of the identification signal is a spacing between two periods of a periodic identification signal in time domain.

The quantity of repetition times of the identification signal is a quantity of times that the identification signal is repeatedly sent.

The transmission time occupied by the identification signal is duration occupied to send the identification signal once in time domain.

Certainly, the time domain resource information may further include other information. This is not specifically limited in this embodiment of the present invention. Content included in the time domain resource information may all be configured based on an actual requirement.

The frequency domain resource information is information used to distinguish different signals in a frequency dimension. The frequency domain resource information of the identification signal may include: a frequency domain bandwidth of the identification signal; or a frequency domain bandwidth of the identification signal and a frequency domain location of the identification signal.

Specifically, the frequency domain bandwidth of the identification signal is a frequency width occupied to send the identification signal once in frequency domain.

The frequency domain location of the identification signal is a frequency-domain absolute location of the identification signal sent once, and includes a low frequency, an intermediate frequency, or a high-frequency, or a frequency-domain relative location, frequency-domain relative locations of different types of identification signals, or frequency-domain relative locations of identification signals of a same type that are sent at different times, for example, relative locations of a primary synchronization signal and a secondary synchronization signal or relative locations of primary synchronization signals sent at different times.

Certainly, the frequency domain resource information may further include other information. This is not specifically limited in this embodiment of the present invention. Content included in the frequency domain resource information may all be configured based on an actual requirement.

The space domain resource information is information used to distinguish different signals in a space dimension. Specifically, the space domain resource information of the identification signal may include at least one piece of the following information: a quantity of antenna ports for transmitting the identification signal, a number of an antenna port for transmitting the identification signal, a quantity of antennas for transmitting the identification signal, a quantity of beams for transmitting the identification signal, and a number of a beam for transmitting the identification signal.

Certainly, the space domain resource information may further include other information. This is not specifically limited in this embodiment of the present invention. Content included in the space domain resource information may all be configured based on an actual requirement.

The code domain resource information is information used to distinguish different signals in an encoding mode dimension. Specifically, the code domain resource information of the identification signal includes at least one piece of the following information: a root sequence of the identification signal, a cyclic shift of the identification signal, an orthogonal cover code of the identification signal, and a scrambling code of the identification signal.

Certainly, the code domain resource information may further include other information. This is not specifically limited in this embodiment of the present invention. Content included in the code domain resource information may all be configured based on an actual requirement.

The power parameter information is information used to distinguish different signals in a power dimension. Specifically, the power parameter information of the identification signal may include: transmit power of the identification signal or a transmit power difference of the identification signal.

The transmit power difference of the identification signal includes a transmit power difference between different types of identification signals, or a transmit power difference between identification signals of a same type that are sent twice.

Certainly, the power parameter information may further include other information. This is not specifically limited in this embodiment of the present invention. Content included in the power parameter information may all be configured based on an actual requirement.

The type information is information used to distinguish different signals in an identification signal type dimension. Specifically, the type information of the identification signal includes at least one piece of the following information: the identification signal is a primary synchronization signal, the identification signal is a secondary synchronization signal, the synchronization signal is a synchronization signal based on a base station, and the identification signal is a synchronization signal based on a satellite.

Certainly, the type information may further include other information. This is not specifically limited in this embodiment of the present invention. Content included in the type information may all be configured based on an actual requirement.

Further optionally, in S401, the determining, by a base station, feature information of an identification signal based on a parameter set of a cell may be implemented in any one of the following two implementations:

A first implementation is as follows:

The feature information of the identification signal is determined based on the parameter set of the cell and a mapping relationship.

The mapping relationship includes a correspondence between a parameter set and at least one piece of feature information.

It should be noted that a specific value of the feature information corresponding to the parameter set may be configured and defined based on an actual requirement, and is known by both communication parties. The specific value of the feature information corresponding to the parameter set is not limited in this embodiment of the present invention.

Optionally, the mapping relationship may include that a parameter set corresponds to a group of feature information, and the parameter set and the group of feature information are in a one-to-one correspondence. The mapping relationship may be queried uniquely and quickly based on the parameter set, to obtain the feature information corresponding to the parameter set. Reversely, the mapping relationship may also be queried uniquely and quickly based on the feature information, to obtain the parameter set corresponding to the feature information. The mapping relationship includes, through enumeration, a combination of all possible feature information and a parameter set corresponding to each group of feature information.

For example, as shown in Table 1, a mapping relationship is shown in a table form.

TABLE 1

| Parameter set | Feature information |
| --- | --- |
| Parameter set 1 | A, b, c . . . |
| Parameter set 2 | A, b, 1 . . . |
| Parameter set 3 | x, b, 4 . . . |
| . . . | . . . |

Optionally, in the mapping relationship, one piece of information in a group of feature information may correspond to a plurality of parameter sets, and an intersection set of parameter sets corresponding to each piece of information in the group of feature information is a unique parameter set. The mapping relationship is queried based on a parameter set, to obtain a plurality of pieces of feature information corresponding to the parameter set to form a group of feature information. Reversely, the mapping relationship is queried based on each piece of the feature information, there are a plurality of corresponding parameter sets, but an intersection set is unique.

For example, as shown in Table 2, another mapping relationship is shown in a table form.

TABLE 2

| Parameter set | Feature information |
| --- | --- |
| Parameter set 1, parameter set 2, . . . | A |
| Parameter set 2, parameter set 5, . . . | B |
| Parameter set 6, parameter set 1, . . . | C |
| . . . | . . . |

Optionally, in the mapping relationship, a parameter in the parameter set may correspond to a plurality of groups of feature information, and an intersection set of feature information corresponding to each parameter in the parameter set is unique feature information. The mapping relationship is queried based on a parameter set, to obtain a plurality of groups of feature information corresponding to each parameter in the parameter set, and an intersection set is a unique group of feature information. Reversely, a plurality of parameters corresponding to feature information is obtained based on the feature information, to form a parameter set.

For example, as shown in Table 3, another mapping relationship is shown in a table form.

TABLE 3

| Parameter | Feature information |
| --- | --- |
| Parameter O | Feature information group 1, feature information group 6, . . . |
| Parameter P | Feature information group 7, feature information group 12, . . . |
| Parameter Q | Feature information group 10, feature information group 5, . . . |
| . . . | . . . |

It should be noted that Table 1, Table 2, and Table 3 only use examples to describe a correspondence between content included in the mapping relationship, and do not specifically limit a form of the mapping relationship and content included in the mapping relationship. In an actual application, a form and specific content of the mapping relationship may be configured based on an actual requirement. This is not specifically limited in this embodiment of the present invention.

A second implementation is as follows:

The base station may calculate a feature parameter of the identification signal based on the parameter set of the cell and a preset formula.

It should be noted that content of the preset formula is not specifically limited in this embodiment of the present invention, and may be configured based on an actual requirement.

For example, the preset formula may be a simple addition, subtraction, multiplication, or division operation, or may be a complex modulo, integral, or derivation operation.

S402: The base station sends the identification signal to a terminal based on the determined feature information of the identification signal.

Specifically, the processor 301 of the base station shown in FIG. 3 may perform specific content in S402 by using a transceiver 303.

Optionally, in S402, the sending, by the base station, the identification signal to a terminal based on the determined feature information of the identification signal may be specifically implemented as: sending the identification signal to the terminal based on a reference parameter set or the parameter set of the cell and the determined feature information of the identification signal.

Specific content of the reference parameter set may be configured based on an actual requirement, and this is not specifically limited in this embodiment of the present invention.

It should be noted that whether the base station sends the identification signal to the terminal based on the reference parameter set or sends the identification signal to the terminal based on the parameter set of the cell may be defined in a communication standard, and is known by both the base station and the terminal.

The following uses an example to describe execution of S402.

When the feature information of the identification signal is time domain resource information, in S402, the base station sends the identification signal based on an indication of the time domain resource information.

When the feature information of the identification signal is frequency domain resource information, in S402, the base station sends the identification signal based on an indication of the frequency domain resource information.

When the feature information of the identification signal is a quantity of antenna ports for transmitting the identification signal, in S402, the identification signal is sent to the terminal by using a determined quantity of antenna ports for transmitting the identification signal. A process of performing S402 is similar to this process for other space domain resource information, and details are not described again.

When the feature information of the identification signal is a root sequence of the identification signal, in S402, the base station encodes the identification signal by using a determined root sequence of the identification signal and then sends the identification signal to the terminal. A process of performing S402 is similar to this process for other code domain resource information, and details are not described again.

When the feature information of the identification signal is transmit power of the identification signal, in S402, the base station sends the identification signal to the terminal by using determined transmit power of the identification signal. A process of performing S402 is similar to this process for other power parameter information, and details are not described again.

When the feature information of the identification signal is that the identification signal is a primary synchronization signal, in S402, the base station sends the primary synchronization signal to the terminal as the identification signal. A process of performing S402 is similar to this process for other type information, and details are not described again.

When the feature information of the identification signal is a type quantity X of the identification signal, in S402, the base station sends X types of identification signals to the terminal.

When the feature information of the identification signal is parameter set indication information, in S402, the base station sends, to the terminal, the identification signal carrying the parameter set indication information.

The following uses an example to describe execution of S402 with reference to accompanying drawings.

Figure 5:
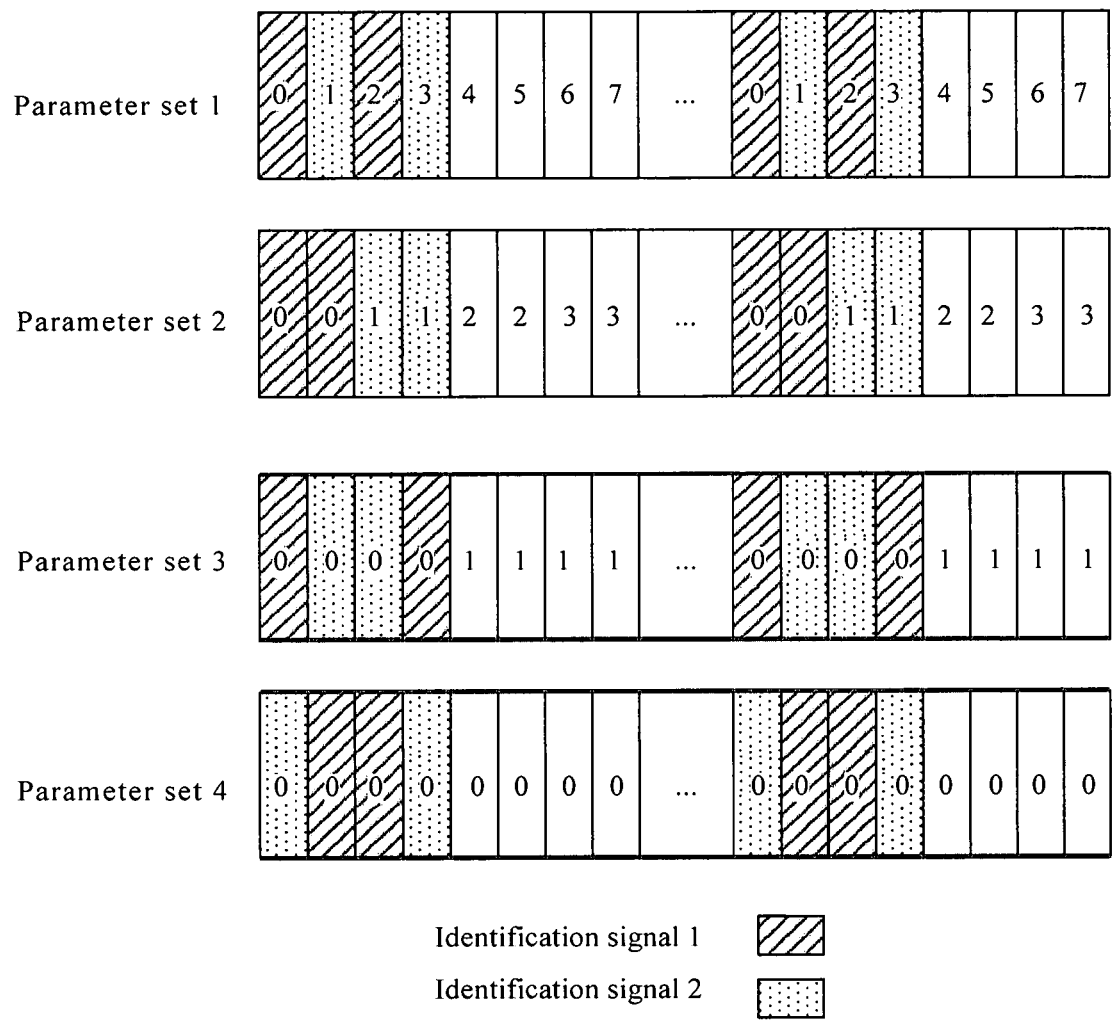
FIG. 5 is a schematic structural diagram of an identification signal according to an embodiment of the present invention.

In a first example, as shown in FIG. 5, when the feature information of the identification signal is a time domain location, four different identification signals are sent to the terminal based on four different pieces of feature information of the identification signal that are determined based on four different parameter sets.

Figure 6:
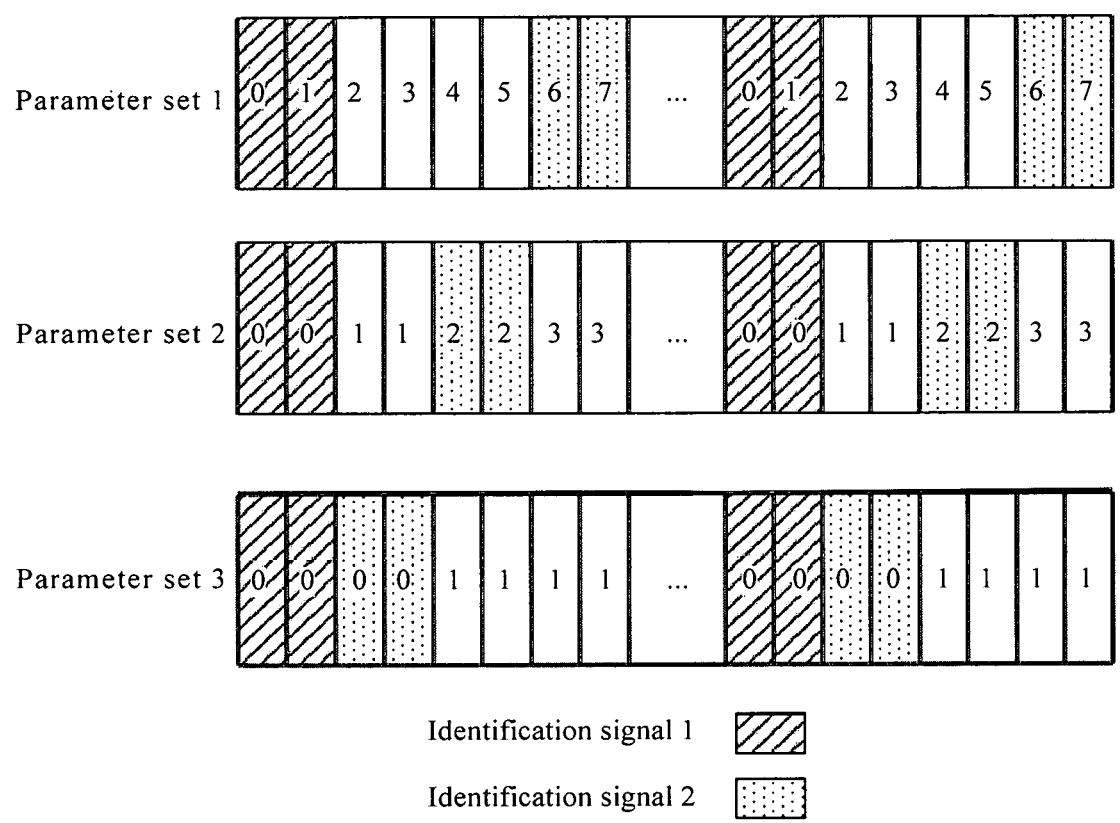
FIG. 6 is a schematic structural diagram of another identification signal according to an embodiment of the present invention.

In a second example, as shown in FIG. 6, when the feature information of the identification signal is a time domain spacing between different types of identification signals, three different identification signals are sent to the terminal based on three different pieces of feature information of the identification signal that are determined based on three different parameter sets.

Figure 7:
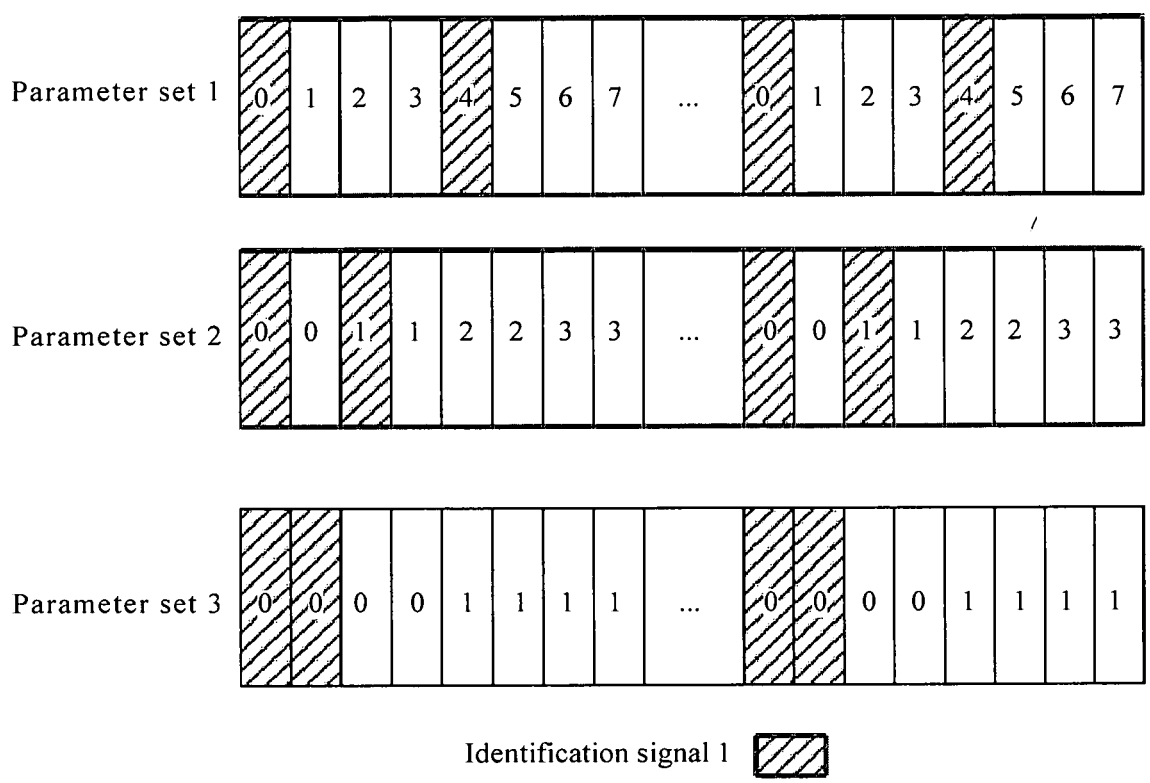
FIG. 7 is a schematic structural diagram of another identification signal according to an embodiment of the present invention.

In a third example, as shown in FIG. 7, when the feature information of the identification signal is a time domain spacing between identification signals of a same type, three different identification signals are sent to the terminal based on three different pieces of feature information of the identification signal that are determined based on three different parameter sets.

Figure 8:
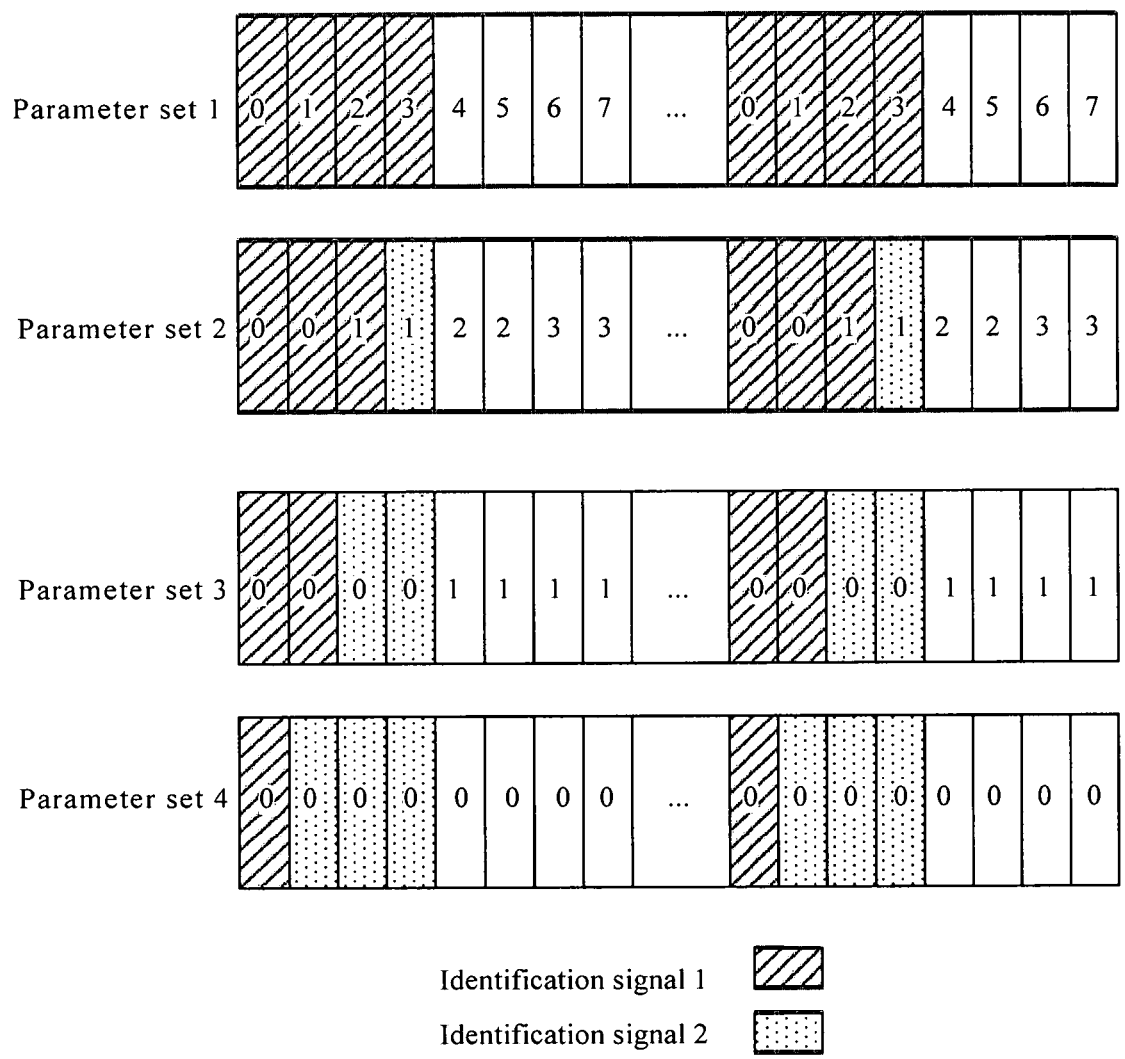
FIG. 8 is a schematic structural diagram of another identification signal according to an embodiment of the present invention.

In a fourth example, as shown in FIG. 8, when the feature information of the identification signal is a quantity of repetition times of the identification signal, four different identification signals are sent to the terminal based on four different pieces of feature information of the identification signal that are determined based on four different parameter sets.

Figure 9:
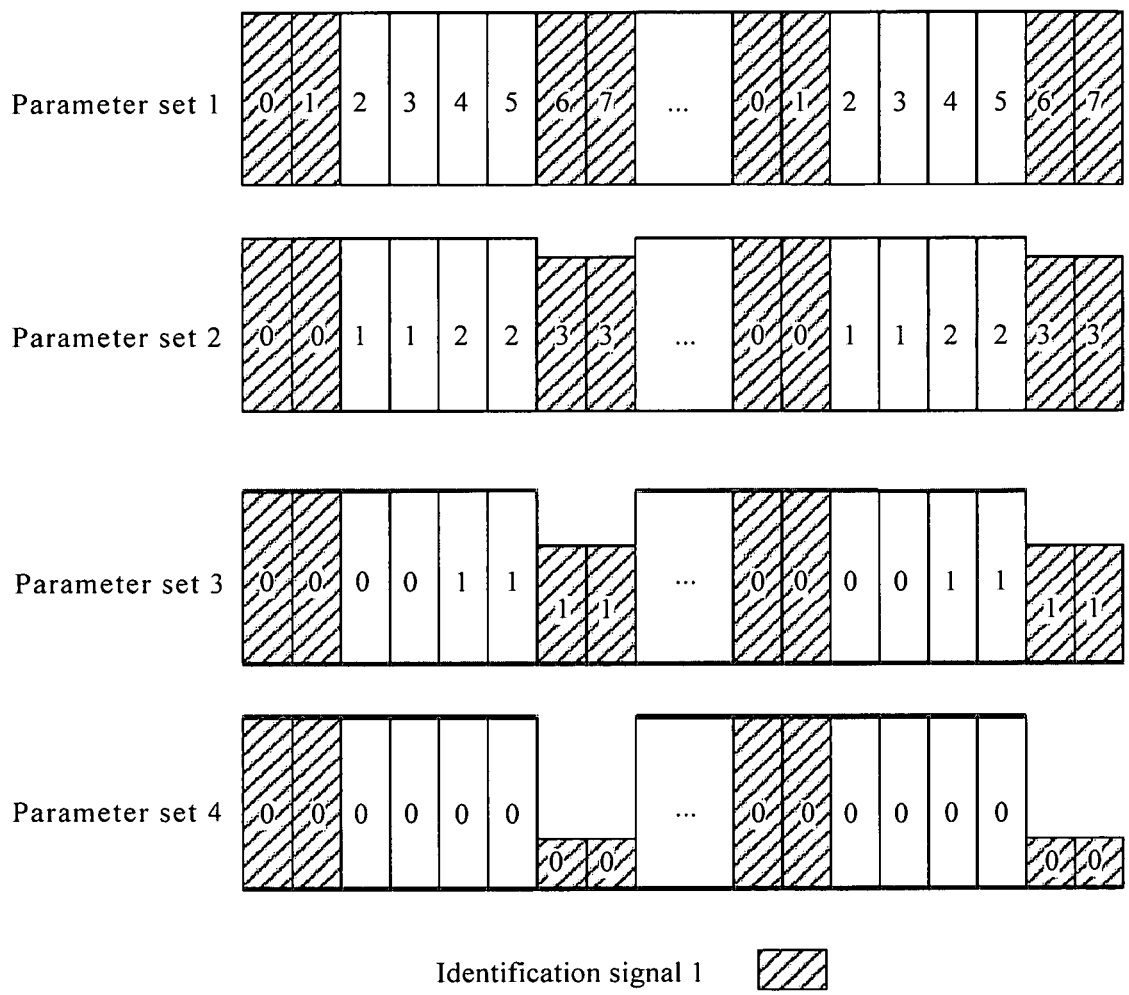
FIG. 9 is a schematic structural diagram of another identification signal according to an embodiment of the present invention.

In a fifth example, as shown in FIG. 9, when the feature information of the identification signal is a transmit power difference between identification signals of a same type, four different identification signals are sent to the terminal based on four different pieces of feature information of the identification signal that are determined based on four different parameter sets.

Figure 10:
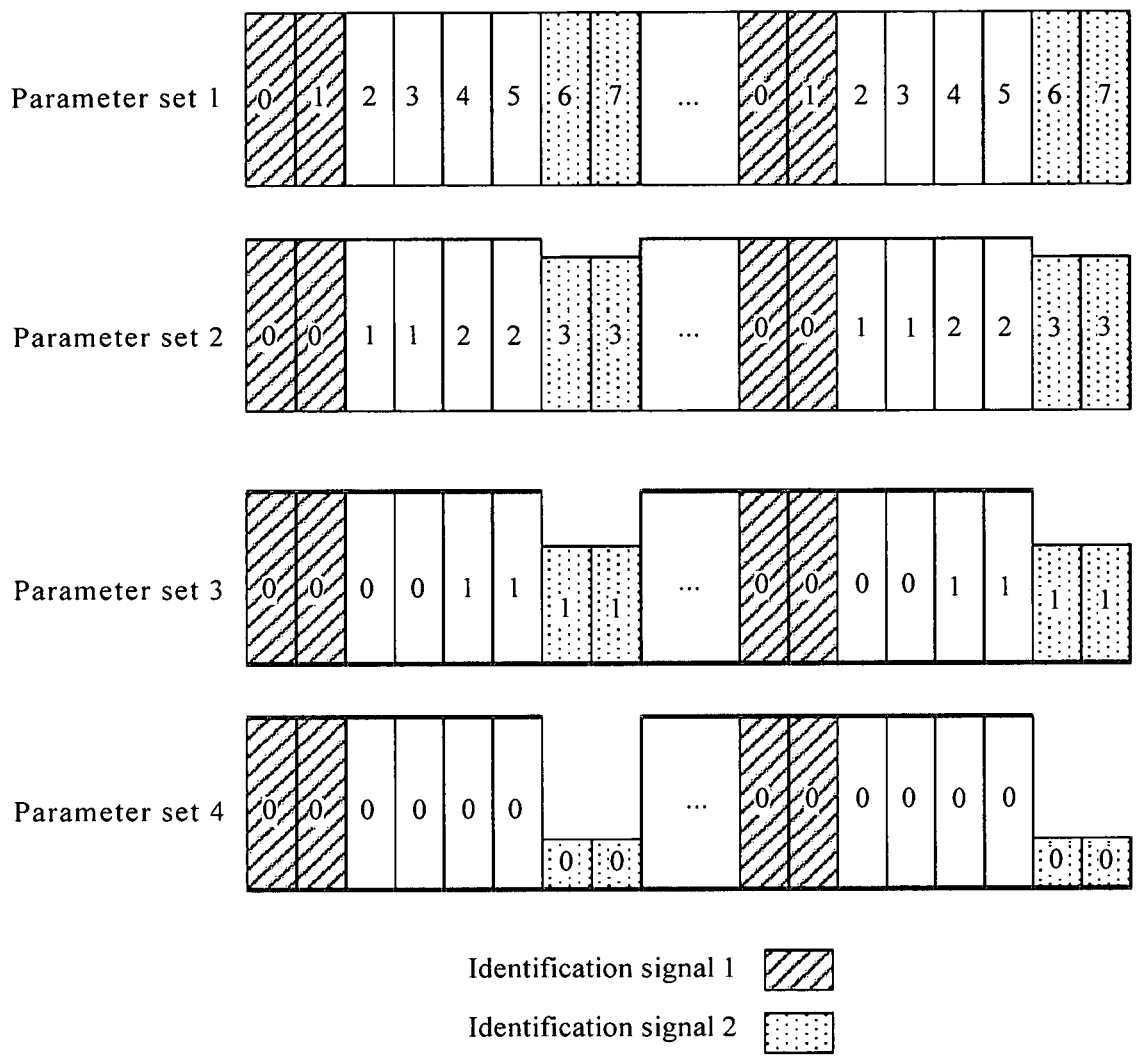
FIG. 10 is a schematic structural diagram of another identification signal according to an embodiment of the present invention.

In a sixth example, as shown in FIG. 10, when the feature information of the identification signal is a transmit power difference between different types of identification signals, four different identification signals are sent to the terminal based on four different pieces of feature information of the identification signal that are determined based on four different parameter sets.

Figure 11:
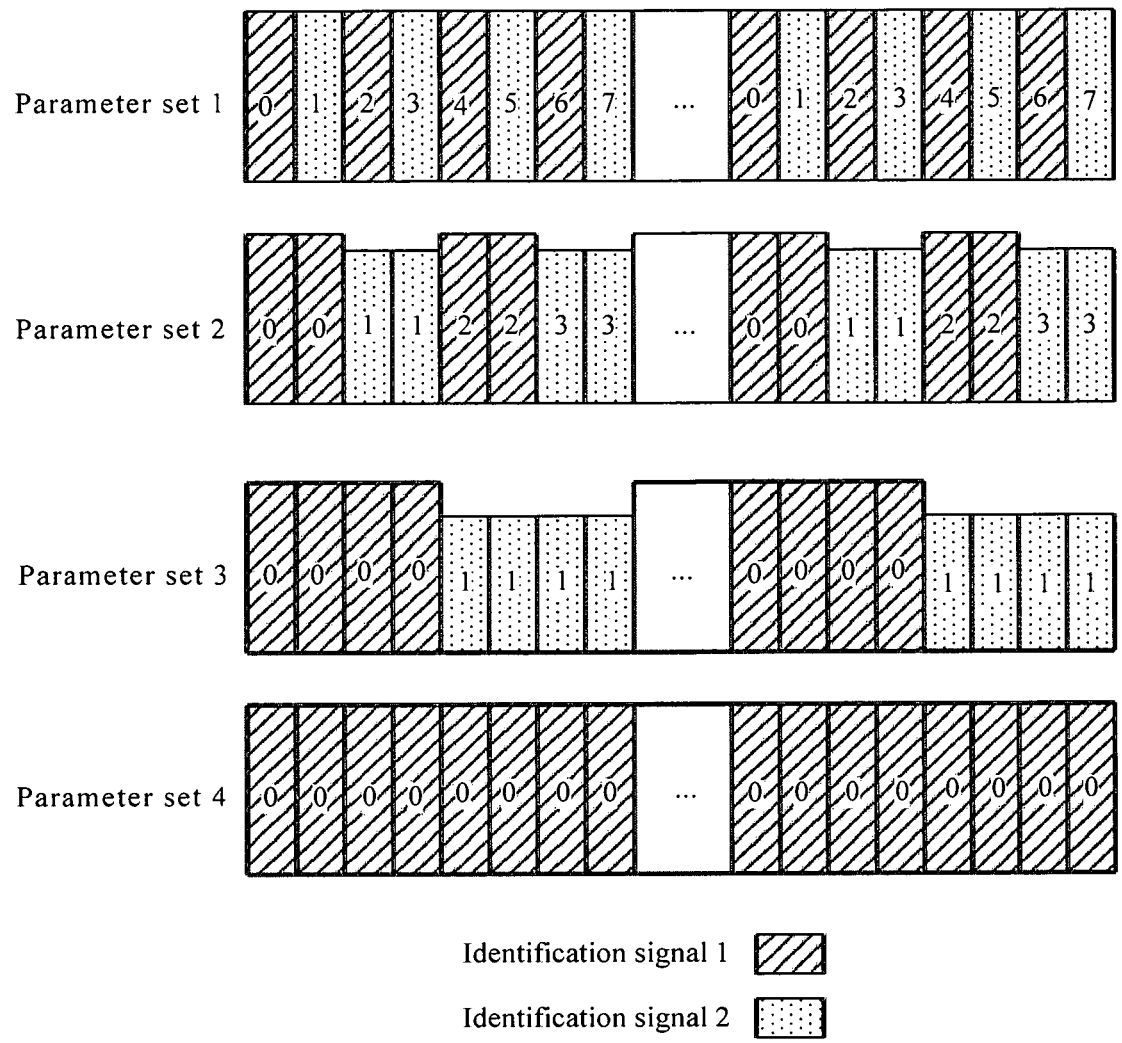
FIG. 11 is a schematic structural diagram of another identification signal according to an embodiment of the present invention.

In a seventh example, as shown in FIG. 11, when the feature information of the identification signal is a transmit power difference between different types of identification signals and a quantity of repetition times of the identification signal, four different identification signals are sent to the terminal based on four different pieces of feature information of the identification signal that are determined based on four different parameter sets.

Figure 12:
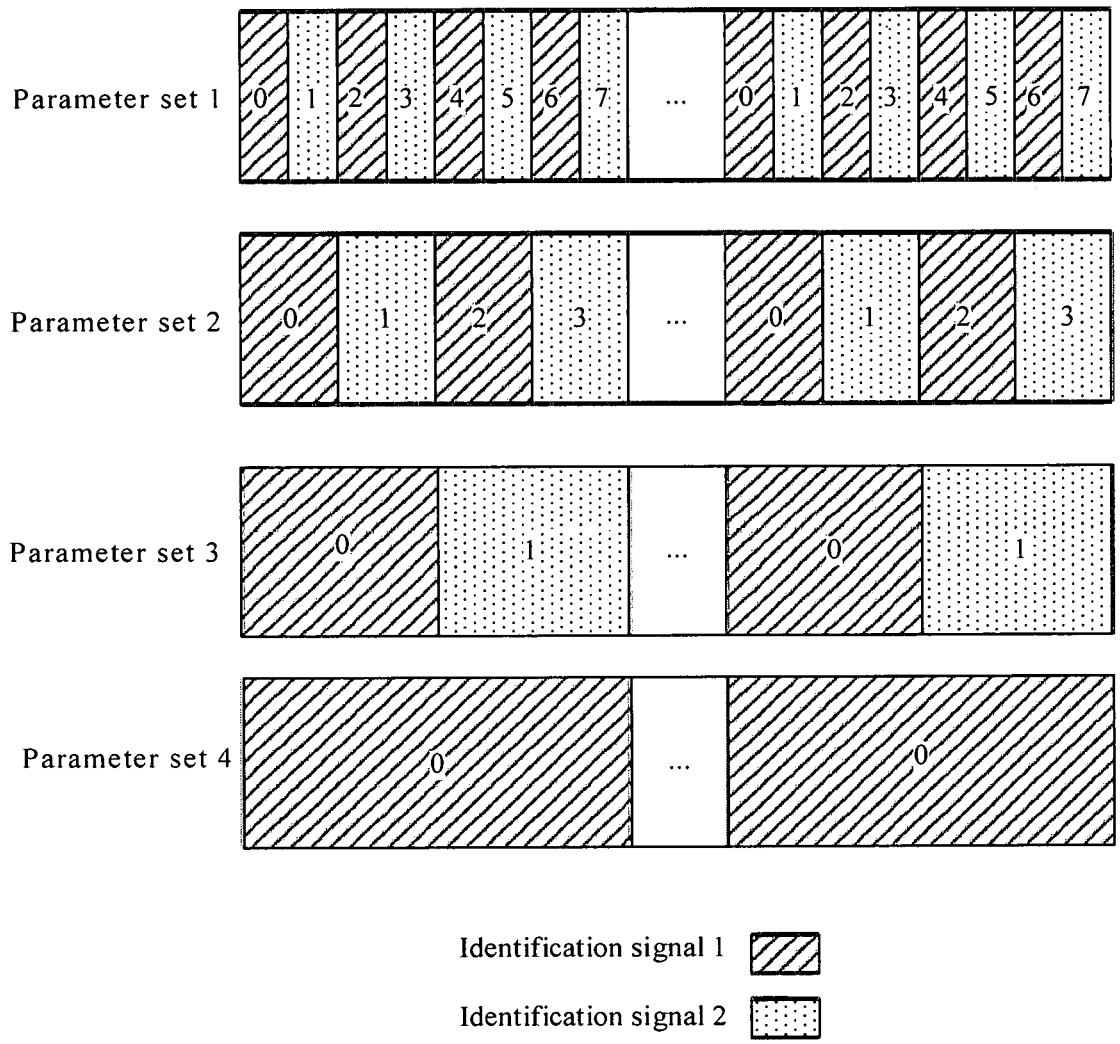
FIG. 12 is a schematic structural diagram of another identification signal according to an embodiment of the present invention.

In an eighth example, as shown in FIG. 12, when the feature information of the identification signal is a transmission time occupied by the identification signal, four different identification signals are sent to the terminal based on four different pieces of feature information of the identification signal that are determined based on four different parameter sets.

Figure 13:
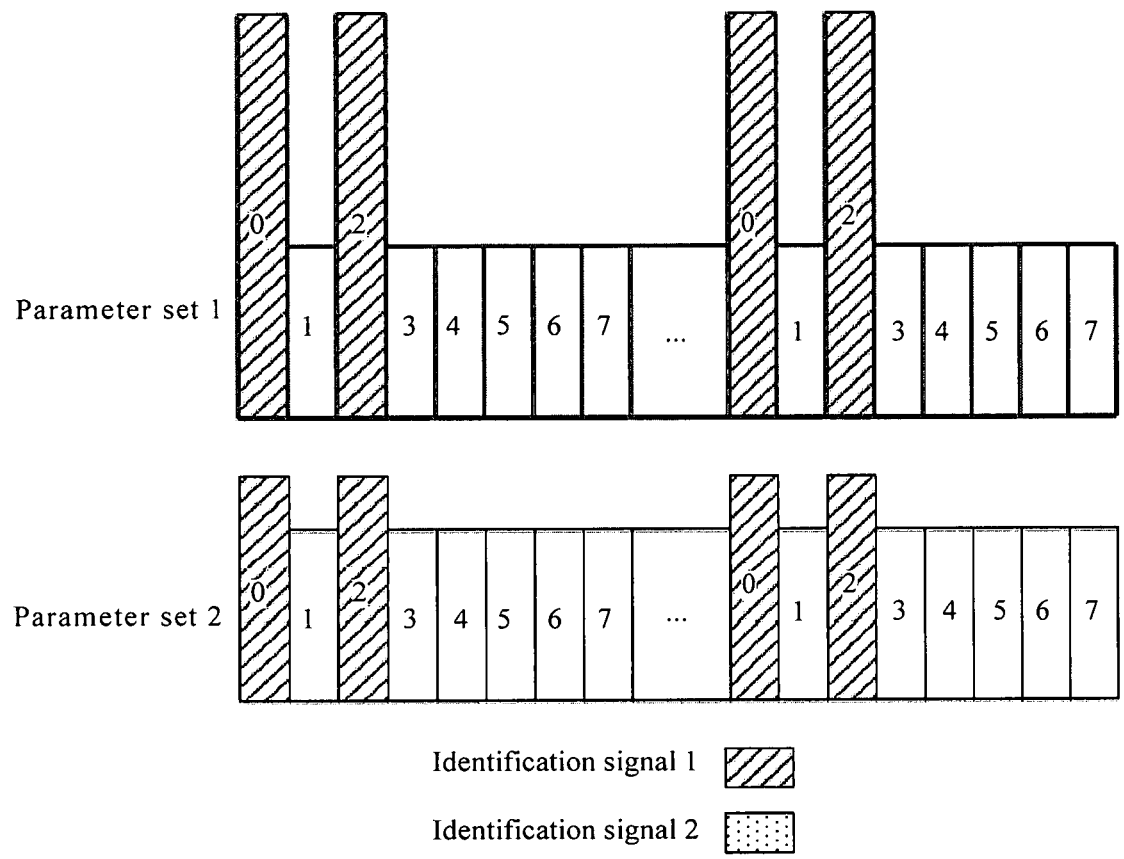
FIG. 13 is a schematic structural diagram of another identification signal according to an embodiment of the present invention.

In a ninth example, as shown in FIG. 13, when the feature information of the identification signal is a frequency domain bandwidth of the identification signal, two different identification signals are sent to the terminal based on two different pieces of feature information of the identification signal that are determined based on two different parameter sets.

Figure 14:
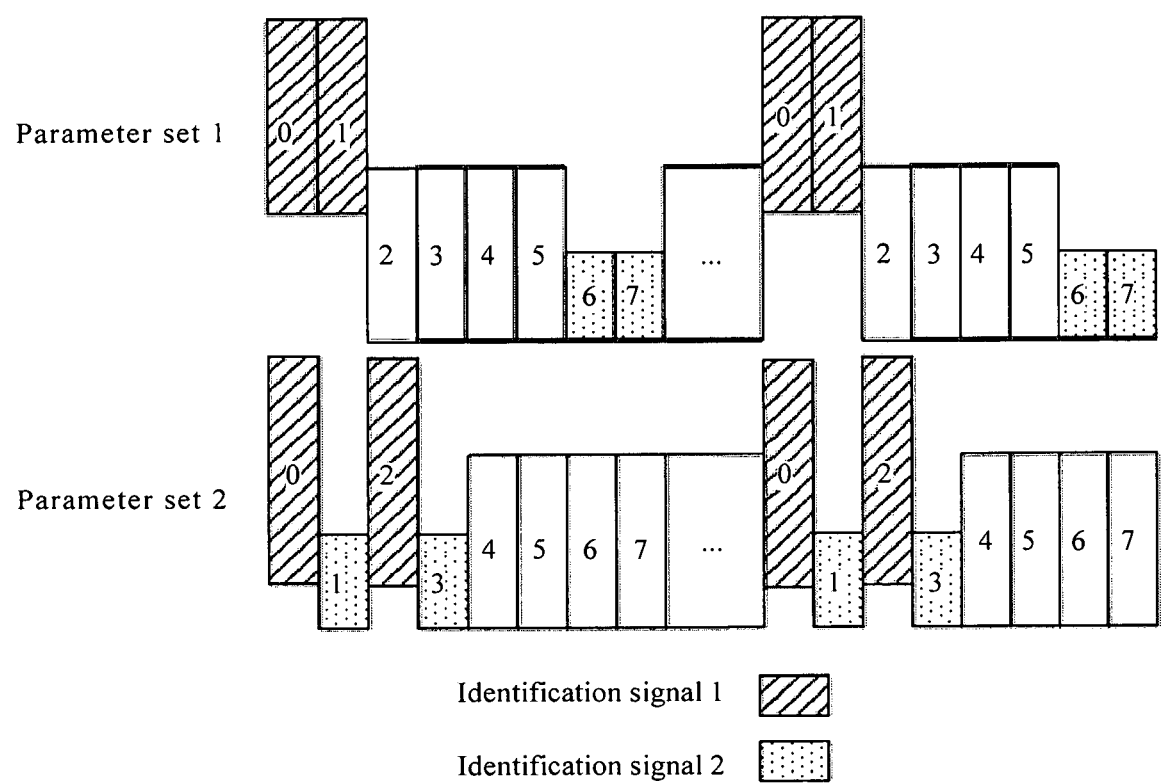
FIG. 14 is a schematic structural diagram of another identification signal according to an embodiment of the present invention.

In a tenth example, as shown in FIG. 14, when the feature information of the identification signal is a frequency domain bandwidth and a frequency domain location of the identification signal, two different identification signals are sent to the terminal based on two different pieces of feature information of the identification signal that are determined based on two different parameter sets.

It should be noted that the foregoing lists processes of performing S402 for different feature information. When the feature information includes a plurality of dimensions, the foregoing processes of performing S402 may be combined, and details are not described herein again.

S403: The terminal obtains the feature information of the identification signal of the cell.

Specifically, a processor 201 of the terminal shown in FIG. 2 may perform specific content in S403 by using a transceiver 203.

In S403, the terminal may perform matching through frequency sweep to obtain the identification signal of the cell, and parse the obtained identification signal to obtain the feature information of the identification signal.

It should be noted that the feature information of the identification signal is predefined and is known by both the base station and the terminal. Therefore, the terminal may obtain the feature information of the identification signal through parsing in S403 based on a pre-definition.

It should be noted that the feature information of the identification signal is already described in detail in S401, and details are not described herein again.

Specifically, in S403, the terminal obtains the identification signal of the cell based on the parameter set. Therefore, a specific manner of obtaining the identification signal of the cell by the terminal depends on a manner of sending the identification signal by the base station in S402.

Optionally, in S403, the obtaining, by the terminal, the feature information of the identification signal of the cell may be specifically implemented in any one of the following two implementations:

Manner A is as follows:

The terminal performs matching based on a reference parameter set, to obtain the identification signal of the cell, and parses the identification signal to obtain the feature information of the identification signal.

Corresponding to manner A, the base station sends the identification signal to the terminal based on a reference parameter set and the determined feature information of the identification signal in S402.

Manner B is as follows:

The terminal sequentially performs matching based on M preset reference parameter sets, until the identification signal of the cell is obtained, and parses the identification signal to obtain the feature information of the identification signal.

M is greater than or equal to 2.

Corresponding to manner B, the base station sends the identification signal to the terminal based on the parameter set of the cell and the determined feature information of the identification signal in S402. Because the terminal does not know the parameter set of the cell, in manner B, the terminal attempts to sequentially perform blind detection and matching based on the M preset reference parameter sets through blind detection. When the identification signal of the cell is obtained based on a reference parameter set, blind detection is ended.

It should be noted that whether the base station sends the identification signal to the terminal based on the reference parameter set or sends the identification signal to the terminal based on the parameter set of the cell may be defined in a communication standard, and is known by both the base station and the terminal. Therefore, whether the terminal uses manner A or manner B in S403 may be selectively configured based on a communication standard.

It should be noted that the identification signal obtained by the terminal in S403 is the identification signal sent by the base station in S402. The identification signal is already described in detail in S401, and details are not described herein again.

S404: The terminal determines the parameter set of the cell based on the feature information of the identification signal.

Specifically, the processor 201 of the terminal shown in FIG. 2 may perform specific content in S404.

The parameter set of the cell includes at least one of the following parameters: a subcarrier spacing, a subframe length, a symbol length, a timeslot length, a CP length, a quantity of symbols in a subframe, a quantity of symbols in a timeslot, a subframe type, a timeslot type, a CP type, a duplex mode, whether a spectrum is a licensed spectrum, whether a carrier is an independent carrier, whether there are a plurality of beams, a quantity of beams, and a service requirement.

It should be noted that the parameter set of the cell is already described in detail in S401, and details are not described herein again.

Specifically, in S404, the determining, by the terminal, the parameter set of the cell based on the feature information of the identification signal may be implemented in any one of the following two solutions:

A first solution is as follows:

The terminal determines the parameter set of the cell from N parameter sets based on the feature information of the identification signal.

N is greater than or equal to 2. The N parameter sets are parameter sets supported by the cell in the communications system.

It should be noted that the process of determining, by the terminal, the parameter set of the cell from the N parameter sets based on the feature information of the identification signal may be implemented in the following second solution, and certainly may be implemented by using a preset formula. The preset formula herein is similar to that in the second implementation in S401 and is not described in detail again.

A second solution is as follows:

The terminal determines the parameter set of the cell based on the feature information of the identification signal and a mapping relationship.

The mapping relationship includes a correspondence between feature information and at least one parameter set.

It should be noted that the mapping relationship and a manner of determining the parameter set of the cell based on the mapping relationship are already described in detail in S401, and details are not described herein again.

In the method for determining a parameter set of a cell and the method for sending a parameter set of a cell that are provided in this embodiment of the present invention, the feature information of the identification signal carries the parameter set of the cell, and different feature information of the identification signal can be used to accurately distinguish different parameter sets of the cell. When obtaining the identification signal, the terminal can accurately identify the parameter set of the cell based on the feature information of the identification signal, so that the terminal can identify the parameter set of the cell in 5G NR supporting a plurality of parameter sets of the cell.

The foregoing mainly describes, from a perspective of interaction between network elements, the solutions provided in the embodiments of the present invention. It may be understood that, to implement the foregoing functions, network elements, for example, a terminal and a base station, include corresponding hardware structures and/or software modules for performing the functions. Persons skilled in the art should easily be aware that in combination with units and algorithms steps in the examples described in the embodiments disclosed in this specification, the present invention may be implemented by hardware or a combination of hardware and computer software. Whether a function is performed by hardware or by hardware driven by computer software depends on particular applications and design constraints of the technical solutions. Persons skilled in the art may use different methods to implement the described functions for each particular application, but it should not be considered that the implementation goes beyond the scope of the present invention.

In the embodiments of the present invention, the terminal and the base station may be divided into functional modules according to the foregoing method example. For example, functional modules corresponding to the functions may be obtained through division, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in an actual implementation.

Figure 15:
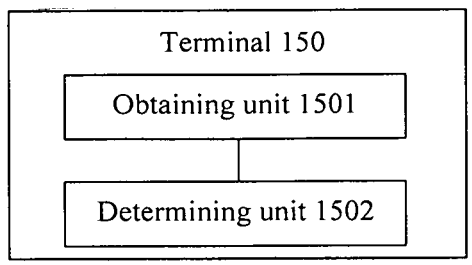
FIG. 15 is a schematic structural diagram of another terminal according to an embodiment of the present invention.

When the functional modules corresponding to the functions are obtained through division, FIG. 15 is a possible schematic structural diagram of a terminal 150 according to the foregoing embodiments. The terminal 150 includes: an obtaining unit 1501 and a determining unit 1502. The obtaining unit 1501 is used by the terminal 150 to perform the process S403 in FIG. 4, and the determining unit 1502 is configured to support the terminal 150 in performing the process S404 in FIG. 4. All related content of the steps in the foregoing method embodiments may be referenced for the function descriptions of the corresponding functional modules. Details are not described herein again.

Figure 16:
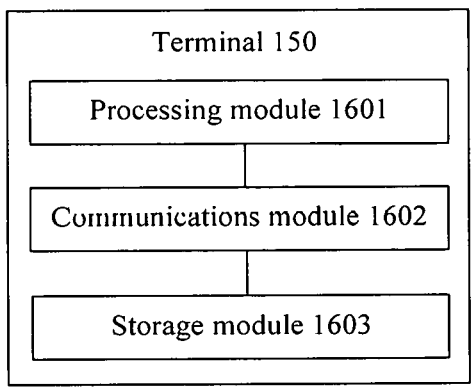
FIG. 16 is a schematic structural diagram of still another terminal according to an embodiment of the present invention.

When an integrated unit is used, FIG. 16 is a possible schematic structural diagram of a terminal 150 according to the foregoing embodiments. The terminal 150 may include: a processing module 1601 and a communications module 1602. The processing module 1601 is configured to control and manage operations of the terminal 150, for example, the processing module 1601 is configured to support the terminal 150 in performing the processes S403 and S404 in FIG. 4. The communications module 1602 is configured to support the terminal in communicating with another network entity. The terminal 150 may further include a storage module 1603, configured to store program code and data of the terminal 150.

The processing module 1601 may be the processor 201 in the physical structure of the terminal 20 shown in FIG. 2, or may be a processor or a controller, for example, may be a CPU, a general-purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 1602 may be the transceiver 203 in the physical structure of the terminal 20 shown in FIG. 2, or may be a transceiver circuit, a communications interface, or the like. The storage module 1603 may be the memory 202 in the physical structure of the terminal 20 shown in FIG. 2.

When the processing module 1601 is a processor, the communications module 1602 is a transceiver, and the storage module 1603 is a memory, the terminal 150 in FIG. 16 in this embodiment of the present invention may be the terminal 20 shown in FIG. 2.

Figure 17:
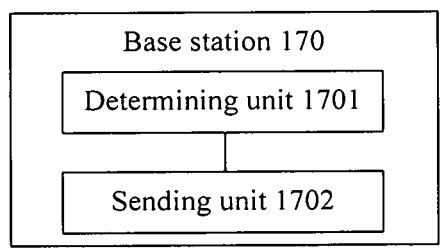
FIG. 17 is a schematic structural diagram of another base station according to an embodiment of the present invention.

When the functional modules corresponding to the functions are obtained through division, FIG. 17 is a possible schematic structural diagram of a base station 170 according to the foregoing embodiments. The base station 170 includes: a determining unit 1701 and a sending unit 1702. The determining unit 1701 is configured to support the base station 170 in performing the process S401 in FIG. 4, and the sending unit 1702 is configured to support the base station 170 in performing the process S402 in FIG. 4. All related content of the steps in the foregoing method embodiments may be referenced for the function descriptions of the corresponding functional modules. Details are not described herein again.

Figure 18:
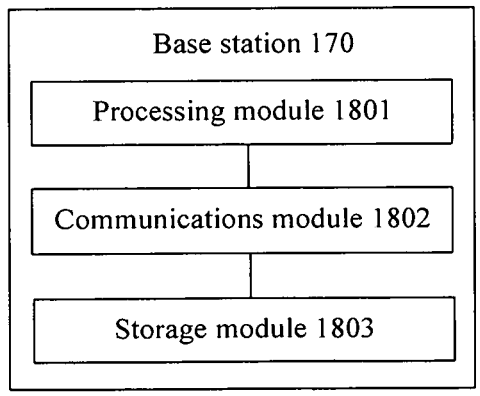
FIG. 18 is a schematic structural diagram of still another base station according to an embodiment of the present invention.

When an integrated unit is used, FIG. 18 is a possible schematic structural diagram of a base station 170 according to the foregoing embodiments. The base station 170 may include: a processing module 1801 and a communications module 1802. The processing module 1801 is configured to control and manage operations of the base station 170, for example, the processing module 1801 is configured to support the base station 170 in performing the process S401 in FIG. 4. For example, the processing module 1801 is further configured to support the base station 170 in performing the process S402 in FIG. 4 by using the communications module 1802. The communications module 1802 is configured to support communication between the base station 170 and another network entity. The base station 170 may further include a storage module 1803, configured to store program code and data of the base station 170.

The processing module 1801 may be the processor 301 in the physical structure of the base station 30 shown in FIG. 3, or may be a processor or a controller, for example, may be a CPU, a general-purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 1802 may be the transceiver 303 in the physical structure of the base station 30 shown in FIG. 3, or may be a transceiver circuit, a communications interface, or the like. The storage module 1803 may be the memory 302 in the physical structure of the base station 30 shown in FIG. 3.

When the processing module 1801 is a processor, the communications module 1802 is a transceiver, and the storage module 1803 is a memory, the base station 170 in FIG. 18 in this embodiment of the present invention may be the base station 30 shown in FIG. 3.

Method or algorithm steps described in combination with the content disclosed in the present invention may be implemented by hardware, or may be implemented by a processor by executing a software instruction. The software instruction may include a corresponding software module. The software module may be stored in a RAM, a flash memory, a ROM, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may alternatively exist in a device as discrete components.

Figure 19:
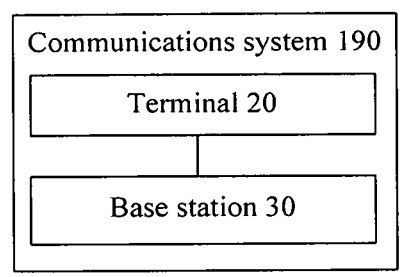
FIG. 19 is a schematic structural diagram of a communications system according to an embodiment of the present invention.

According to another aspect, an embodiment of the present invention provides a communications system 190. As shown in FIG. 19, the communications system 190 may include:

the terminal 20 according to any one of the foregoing embodiments and the base station 30 according to any one of the foregoing embodiments.

Figure 20:
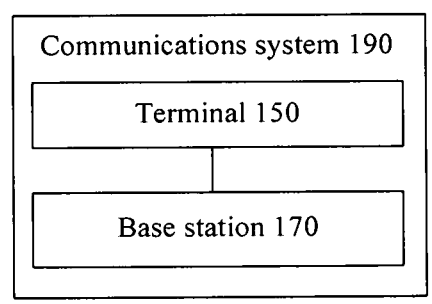
FIG. 20 is a schematic structural diagram of a communications system according to an embodiment of the present invention.

An embodiment of the present invention provides another communications system 190. As shown in FIG. 20, the communications system 190 may include:

the terminal 150 according to any one of the foregoing embodiments and the base station 170 according to any one of the foregoing embodiments.

It should be further noted that FIG. 19 or FIG. 20 shows only an example of an architecture of the communications system 190, and does not limit a quantity of terminals and base stations included in the communications system 190.

Persons skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer. It may be clearly understood by persons skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A communication method, the method comprising:
determining a first subcarrier spacing of an identification signal, wherein the first subcarrier spacing belongs to at least two subcarrier spacings of the identification signal, different subcarrier spacings of the at least two subcarrier spacings are associated with different feature information of the identification signal, wherein each of the different feature information of the identification signal comprises a group of time domain locations of the identification signal, a group of frequency domain locations of the identification signal and a group of code domain resource information of the identification signal, and the identification signal comprises a broadcast channel;

determining first feature information of the identification signal, the first feature information of the identification signal are feature information of the identification signal corresponding to the first subcarrier spacing, wherein the first feature information of the identification signal comprises a first group of time domain locations of the identification signal, a first group of frequency domain locations of the identification signal, and a first group of code domain resource information of the identification signal; and sending the identification signal with the first subcarrier spacing to a terminal by using the first feature information of the identification signal;

wherein each of the time domain locations of the identification signal comprises at least one of:
a time domain spacing of the identification signal, a period of the identification signal, or a transmission time occupied by the identification signal;

wherein each of the frequency domain locations of the identification signal comprises at least one of: a frequency domain bandwidth of the identification signal, a frequency domain bandwidth of the identification signal, or a frequency domain location of the identification signal; and wherein each of the code domain resource information of the identification signal comprises at least one piece of: a root sequence of the identification signal, a cyclic shift of the identification signal, an orthogonal cover code of the identification signal, or a scrambling code of the identification signal.

2. The method according to claim 1, wherein the at least one subcarrier spacing comprises at least one of:
3.75 kilohertz (kHz), 9 kHz, 7.5 kHz, 15 kHz, 30 kHz, 60 kHz, 120 kHz, 240 kHz, or 480 kHz.

3. The method according to claim 1, wherein the first group of time domain locations of the identification signal is determined based on a preset formula.

4. An apparatus, wherein the apparatus comprises:
at least one processor, configured to:
determine a first subcarrier spacing of an identification signal, wherein the first subcarrier spacing belongs to at least two subcarrier spacings of the identical signal, different subcarrier spacings of the at least two subcarrier spacings are associated with different feature information of the identification signal, wherein each of the different feature information of the identification signal comprises a group of time domain location of the identification signal, a group of frequency domain locations of the identification signal, and a group of code domain resource information of the identification signal, and the identification signal comprises a broadcast channel; and
determine first feature information of the identification signal, the first feature information of the identification signal are feature information of the identification signal corresponding to the first subcarrier spacing, wherein the first feature information of the identification signal comprises a first group of time domain locations of the identification signal, a first group of frequency domain locations of the identification signal, and a first group of code domain resource information of the identification signal; and
a transceiver, configured to send the identification signal with the first subcarrier spacing to a terminal on the first group of time domain locations by using the first group of frequency domain locations of the identification signal, and the first code domain resource information of the identification signal;
wherein each of the time domain locations of the identification signal comprises at least one of:
a time domain spacing of the identification signal, a period of the identification signal, or a transmission time occupied by the identification signal;
wherein each of the frequency domain locations of the identification signal comprises at least one of: a frequency domain bandwidth of the identification signal, a frequency domain bandwidth of the identification signal, or a frequency domain location of the identification signal; and
wherein each of the code domain resource information of the identification signal comprises at least one piece of:
a root sequence of the identification signal, a cyclic shift of the identification signal, an orthogonal cover code of the identification signal, or a scrambling code of the identification signal.

5. The apparatus according to claim 4, wherein the at least one subcarrier spacing comprises at least one of:
3.75 kilohertz (kHz), 9 kHz, 7.5 kHz, 15 kHz, 30 kHz, 60 kHz, 120 kHz, 240 kHz, or 480 kHz.

6. The apparatus according to claim 4, wherein
the first group of time domain locations of the identification signal is determined based on a preset formula.

7. A communication method, comprising:
determining first feature information of an identification signal, wherein the first feature information of the identification signal are feature information of the identification signal corresponding to a first subcarrier spacing, wherein the first subcarrier spacing belongs to at least two subcarrier spacings of the identification signal, and different subcarrier spacings of the at least two subcarrier spacings are associated with different feature information of the identification signal, wherein each of the different feature information of the identification signal comprises a group of time domain locations of the identification signal, a group of frequency domain locations of the identification signal, and a group of code domain resource information of the identification signal, and the identification signal comprises a broadcast channel; and
detecting the identification signal with the first subcarrier spacing by using the first feature information of the identification signal, wherein the first feature information of the identification signal comprises a first group of time domain locations of the identification signal, a first group of frequency domain locations of the identification signal, and a first group of code domain resource information of the identification signal;
wherein each of the time domain locations of the identification signal comprises at least one of: a time domain spacing of the identification signal, a period of the identification signal, or a transmission time occupied by the identification signal;
wherein each of the frequency domain locations of the identification signal comprises at least one of: a frequency domain bandwidth of the identification signal, a frequency domain bandwidth of the identification signal, or a frequency domain location of the identification signal; and
wherein each of the code domain resource information of the identification signal comprises at least one piece of:
a root sequence of the identification signal, a cyclic shift of the identification signal, an orthogonal cover code of the identification signal, or a scrambling code of the identification signal.

8. The method according to claim 7, wherein the at least one subcarrier spacing comprises at least one of:
3.75 kilohertz (kHz), 9 kHz, 7.5 kHz, 15 kHz, 30 kHz, 60 kHz, 120 kHz, 240 kHz, or 480 kHz.

9. The method according to claim 7, wherein the first group of time domain locations of the identification signal is determined based on a preset formula.

10. An apparatus, wherein the apparatus comprises:
at least one processor, configured to:
determine first feature information of an identification signal, wherein the first feature information of the identification signal are feature information of the identification signal corresponding to a first subcarrier spacing, wherein the first subcarrier spacing belongs to at least two subcarrier spacings of the identification signal, and different subcarrier spacings of the at least two subcarrier spacings are associated with different feature information of the identification signal, wherein each of the different feature information of the identification signal comprises a group of time domain locations of the identification signal, a group of frequency domain locations of the identification signal, and a group of code domain resource information of the identification signal, and the identification signal comprises a broadcast channel; and
a transceiver, configured to detect the identification signal with the first subcarrier spacing by using the first feature information of the identification signal, wherein the first feature information of the identification signal comprises a first group of time domain locations of the identification signal, a first group of frequency domain locations of the identification signal, and a first group of code domain resource information of the identification signal;

wherein each of the time domain locations of the identification signal comprises at least one of: a time domain spacing of the identification signal, a period of the identification signal, or a transmission time occupied by the identification signal;

wherein each of the frequency domain locations of the identification signal comprises at least one of: a frequency domain bandwidth of the identification signal, a frequency domain bandwidth of the identification signal, or a frequency domain location of the identification signal; and wherein each of the code domain resource information of the identification signal comprises at least one piece of: a root sequence of the identification signal, a cyclic shift of the identification signal, an orthogonal cover code of the identification signal, or a scrambling code of the identification signal.

11. The apparatus according to claim 10, wherein the at least one subcarrier spacing comprises at least one of:
3.75 kilohertz (kHz), 9 kHz, 7.5 kHz, 15 kHz, 30 kHz, 60 kHz, 120 kHz, 240 kHz, or 480 kHz.

12. The apparatus according to claim 10, wherein the first group of time domain locations of the identification signal is determined based on a preset formula.

* * * * *